United States Patent
Chen

(10) Patent No.: US 9,477,429 B2
(45) Date of Patent: Oct. 25, 2016

(54) BLOCK STORAGE GATEWAY MODULE, METHOD FOR PROVIDING ACCESS TO BLOCK STORAGE, MEDIATOR SYSTEM AND MEDIATING METHOD FOR STORAGE, CLOUD STORAGE SYSTEM, AND CONTENT DELIVERY APPARATUS

(71) Applicant: Wistron Corp., New Taipei (TW)

(72) Inventor: Chih-Ming Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 155 days.

(21) Appl. No.: 14/270,872

(22) Filed: May 6, 2014

(65) Prior Publication Data

US 2015/0186200 A1 Jul. 2, 2015

(30) Foreign Application Priority Data

Dec. 27, 2013 (TW) .............................. 102148862 A

(51) Int. Cl.
*G06F 11/07* (2006.01)
*G06F 3/06* (2006.01)
*G06F 11/10* (2006.01)

(52) U.S. Cl.
CPC ........... *G06F 3/0683* (2013.01); *G06F 3/0619* (2013.01); *G06F 3/0655* (2013.01); *G06F 11/10* (2013.01)

(58) Field of Classification Search
CPC .... G06F 3/0619; G06F 11/08; G06F 3/0683; G06F 3/0655
See application file for complete search history.

(56) References Cited

U.S. PATENT DOCUMENTS

| | | | |
|---|---|---|---|
| 2004/0122834 A1* | 6/2004 | Durrant | G06F 9/4425 |
| 2010/0094981 A1* | 4/2010 | Cordray | G06F 15/177 709/222 |
| 2010/0333116 A1 | 12/2010 | Prahlad et al. | |
| 2012/0233134 A1 | 9/2012 | Barton et al. | |
| 2013/0104190 A1* | 4/2013 | Simske | G06F 21/60 726/1 |
| 2014/0372508 A1* | 12/2014 | Fausak | H04L 67/02 709/203 |

FOREIGN PATENT DOCUMENTS

| | | |
|---|---|---|
| CN | 102270161 A | 12/2011 |
| TW | M434977 U1 | 8/2012 |

* cited by examiner

*Primary Examiner* — Albert Decady
*Assistant Examiner* — Kyle Vallecillo
(74) *Attorney, Agent, or Firm* — Muncy, Geissler, Olds & Lowe, P.C.

(57) ABSTRACT

Disclosed herein is a block storage gateway module comprising a receiver unit and an access unit. The receiver unit intercepts an operating system call indicating a local access to a storage volume in order to generate a proximal access command. The access unit proximally accesses a storage array based on the said command. The storage array corresponds to the storage volume; the proximal access corresponds to the local access. Also disclosed herein is a mediator system for storage, the system comprising a load balancer device and one or more storage resource devices. Each storage resource device comprises an aforementioned module and a daemon module. The load balancer device receives a remote access request, selects one storage resource device, and sends an address of the selected storage resource device in a grant message.

43 Claims, 6 Drawing Sheets

BLOCK STORAGE GATEWAY MODULE, METHOD FOR PROVIDING ACCESS TO BLOCK STORAGE, MEDIATOR SYSTEM AND MEDIATING METHOD FOR STORAGE, CLOUD STORAGE SYSTEM, AND CONTENT DELIVERY APPARATUS

CROSS-REFERENCE TO RELATED APPLICATIONS

This non-provisional application claims priority under 35 U.S.C. §119(a) on Patent Application No. 102148862 filed in Taiwan, R.O.C. on Dec. 27, 2013, the entire contents of which are hereby incorporated by reference.

TECHNICAL FIELD

The present invention relates to cloud storage, particularly to the art of providing fault-tolerant access to and load balancing of block storage.

BACKGROUND

All common storage devices, e.g. hard disk drives, optical disks, flash memories, and magnetic tapes, are implemented as block storage, the appellation "block" signifying that data is read or written on the storage devices as fixed-length bit strings. As a high-level concept, however, cloud storage emphasizes load balancing, extremely high availability, and the ability to scale in and out, and is oblivious to the operation of lower-level storage devices. With the advent of the era of big data, a mechanism is needed to wrap or virtualize block storage devices to an abstract layer so as to render them cloud-worthy.

SUMMARY

In light of the above, the present invention discloses a block storage gateway module, a mediator system for storage comprising a said module, a corresponding mediating method, a cloud storage system comprising a said mediator system, a method corresponding to the said module for providing access to block storage, and a content delivery apparatus for deploying a computer capable of executing that method. An access may be, but not limited to, a read, write, open, close, erase, scan, format, set, verify, or test/diagnosis operation.

The block storage gateway module provided by this disclosure comprises a receiver unit and an access unit. The receiver unit is configured to intercept a system call to an operating system in order to generate a proximal access command, the system call indicating a local access to a storage volume. The access unit is configured to perform, based on the proximal access command, a proximal access to a storage array corresponding to the storage volume. In one embodiment, the block storage gateway module further comprises a codec unit configured to generate a fault-tolerant datum corresponding to an original datum and to restore the original datum from the fault-tolerant datum. The proximal access signifies reading the fault-tolerant datum from the storage array when the local access signifies reading the original datum from the storage volume. The proximal access signifies writing the fault-tolerant datum into the storage array when the local access signifies writing the original datum into the storage volume.

In the method for providing access to block storage, as provided by this disclosure, a system call to an operating system is intercepted in order to generate a proximal access command, based on which a proximal access to a storage array is performed. The system call indicates a local access to a storage volume corresponding to the storage array. In one embodiment, a fault-tolerant datum corresponding to an original datum is generated and written into the storage array when the local access signifies writing the original datum into the storage volume. In another embodiment, the fault-tolerant datum is read from the storage array and restored to the original datum when the local access signifies reading the original datum from the storage volume.

The mediator system for storage, as provided by this disclosure, comprises at least one storage resource device and a load balancer device. The storage resource device comprises a daemon module and a block storage gateway module. The daemon module is configured to receive a remote access command in order to generate a system call, the remote access command indicating a remote access to the storage resource device. The block storage gateway module is configured to intercept the system call and thereby perform a proximal access to a storage array. The proximal access corresponds to the remote access; the storage array corresponds to the storage resource device. The load balancer device is configured to receive a remote access request, to select one of the one or more storage resource devices, and to send a grant message comprising an address of the selected storage resource device.

The mediating method for storage, as provided by this disclosure, comprises: receiving a remote access request; selecting one of one or more storage resource devices; sending a grant message comprising an address of the selected storage resource device; receiving a remote access command in order to generate a system call, the remote access command indicating a remote access to the selected storage resource device; intercepting the system call; and performing, based on the system call, a proximal access to a storage array. The proximal access corresponds to the remote access; the storage array corresponds to the storage resource device.

The cloud storage system provided by this disclosure comprises a plurality of storage nodes, one or more storage resource devices, and a load balancer device. Each storage resource device is configured to receive a remote access command, to intercept a system call corresponding thereto, and to perform, based on the system call, a proximal access to a storage array. The remote access command indicates a remote access to the storage resource device; the storage array corresponds to the storage resource device and comprises at least a portion of the storage nodes. The load balancer device is configured to receive a remote access request, to select one of the one or more storage resource devices, and to send a grant message comprising an address of the selected storage resource device.

The content delivery apparatus provided by this disclosure is configured to deploy a computer, causing it to be provided with program code which in turn causes it to execute a plurality of instructions. The instructions comprises: intercepting a system call to an operating system in order to generate a proximal access command, the system call indicating a local access to a storage volume; and performing, based on the proximal access command, a proximal access to a storage array corresponding to the storage volume. In one embodiment, a fault-tolerant datum corresponding to an original datum is generated and written into the storage array when the local access signifies writing the original datum into the storage volume. In another embodiment, the fault-tolerant datum is read from the storage array and restored to the original datum when the local access signifies reading the original datum from the storage volume.

BRIEF DESCRIPTION OF THE DRAWING

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
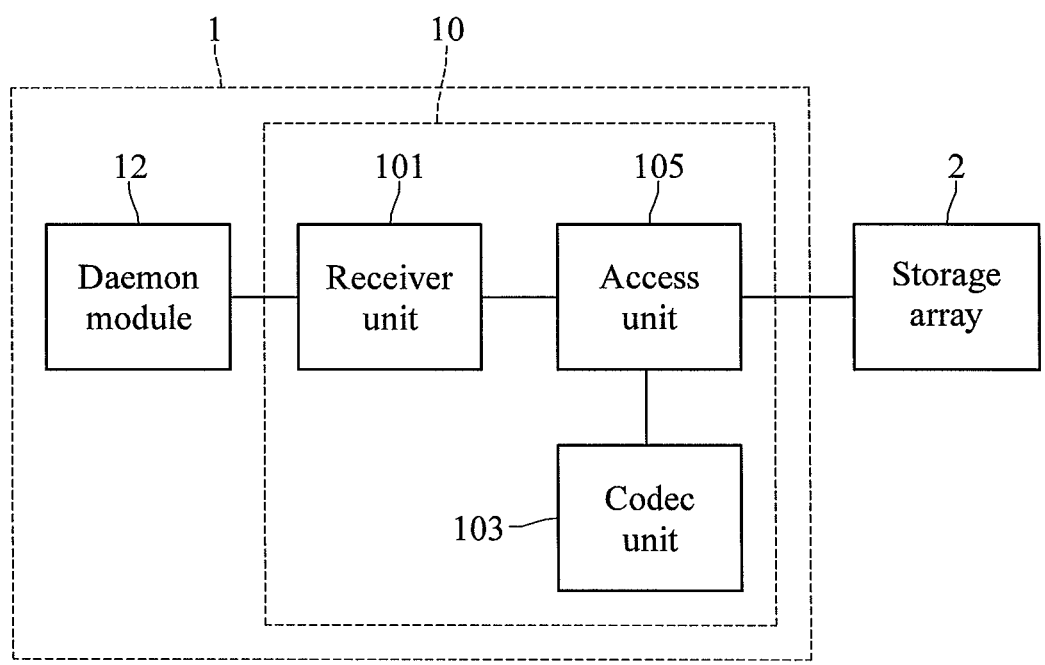
FIG. 1A is a block diagram illustrating a block storage gateway module and a storage resource device, in accordance with an embodiment of the present invention.
Figure 1B:
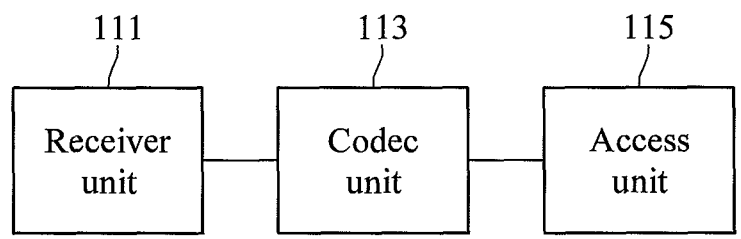
FIG. 1B is a block diagram of a block storage gateway module, in accordance with another embodiment of the present invention.

Please refer to FIG. 1A. As shown in the block diagram, a block storage gateway module 10 belongs to a storage resource device 1 and comprises a receiver unit 101, a codec unit 103, and an access unit 105. The access unit 105 is coupled with a storage array 2. The storage resource device 1 comprises additionally a daemon module 12. In this embodiment, the daemon module 12, the receiver unit 101, the access unit 105, and the storage array 2 form an uninterrupted chain of command, and the codec unit 103 is a functional block made use of by the access unit 105. In another embodiment, however, as shown in FIG. 1B, a block storage gateway module 11 may be such that a receiver unit 111 is coupled with a codec unit 113, which is in turn coupled with an access unit 115.

In the operating system run on a computer implementing the storage resource device 1, the receiver unit 101 may be a hooked or injected kernel module configured to receive a system call generated by the daemon module 12 to access a local storage volume. The storage volume may be virtualized storage like a logical volume and thus may not be physically present in the computer. The system call, intended for handling by another kernel module or driver inherent to the operating system, is intercepted by the receiver unit 101, which generates a corresponding proximal access command for the access unit 105. In other words, the receiver unit 101 augments or replaces in part the executable, object code, or machine code for handling system calls associated with the said storage volume in the operating system. The built-in program code of the operating system may still be executed before, during, or after the receiver unit 101.

One way to hook the receiver unit 101 is to direct an entry in the system call table of the operating system (syscall_table.S in some Linux distributions) instructing how the system call should be handled toward the file path or memory location on which the receiver unit 101 resides. In an operating system without an apparent system call table, hooking the receiver unit 101 may involve replacing the input/output area where the built-in program code resides directly with the receiver unit 101, and selectively backing up the built-in program code beforehand.

Figure 1C:
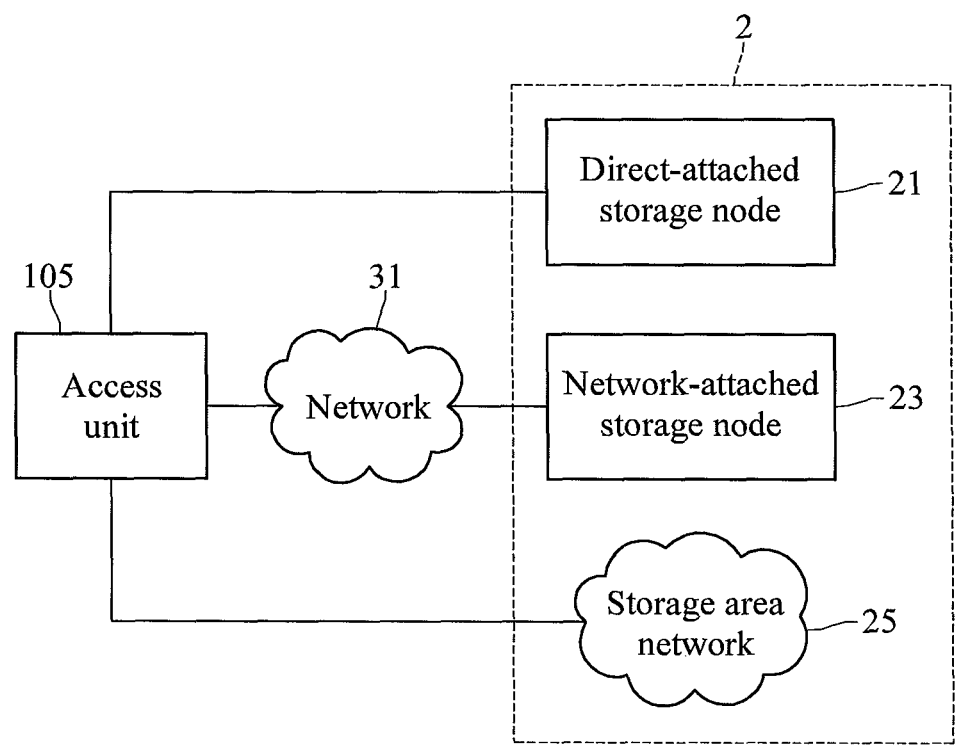
FIG. 1C is a block diagram illustrating a storage array, in accordance with an embodiment of the present invention.

In one embodiment, the said proximal access command is an input/output control, such as ioctl on Linux or Mac operating systems, or DeviceIoControl defined in the Microsoft Windows API (application programming interface), while part or all of the access unit 105 resides in the user space or userland. In another embodiment, the proximal access command is an inter-process communication (IPC) from the receiver unit 101 to a driver that is also in the kernel space and is subordinate to the access unit 105. The proximal access command is configured to instruct the access unit 105 to access the storage array 2 coupled therewith. The access here is a proximal one for it may be a bus, cable, or local area network that lies between the access unit 105 and the storage array 2. Please refer to FIG. 1C for an illustration of the proximal relationship between the access unit 105 and the storage array 2. As shown in the block diagram, the storage array 2 is an arbitrary combination of an arbitrary number of direct-attached storage (DAS) nodes 21, network-attached storage (NAS) nodes 23, or storage area networks (SAN) 25. The NAS nodes 23 are coupled with the access unit 105 through a wired or wireless network 31. As a basic unit of the storage array 2, a storage node may be a block device, e.g. a DAS node 21 or a constituent of a SAN 25. Please note that the storage array 2, corresponding to the said storage volume or the storage resource device 1, is what is visible to the access unit 105 or the block storage gateway module 10, and what is perceived by the access unit 115 or the block storage gateway module 11 may be another storage array. Obviously the storage arrays may be disjoint or share at least some of their elements. They are a collection or a family of sets of all the storage nodes that are mentioned in this disclosure.

The proximal access corresponds to the local access to the storage volume as signified by the said system call; that is, both instances of access have the same operational nature. For example, if the daemon module 12 intends that an original datum written into the storage volume, then the access unit 105 instructs the codec unit 103 to generate a fault-tolerant version of the original datum and writes it into the storage array 2, based on the conversion of commands by the receiver unit 101. In the case of the block storage gateway module 11, the codec unit 113 generates the fault-tolerant datum and forwards it along with the proximal access command to the access unit 115.

Figure 2A:
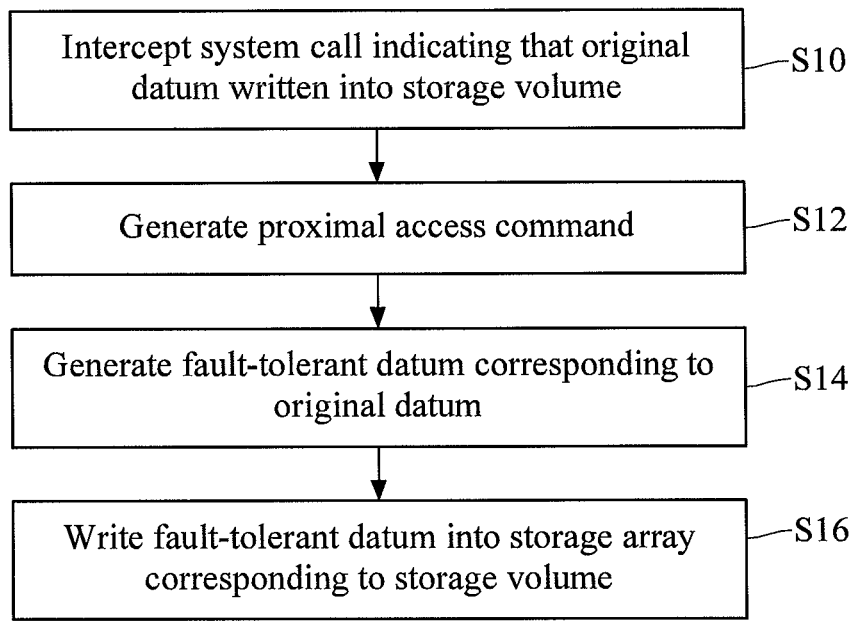
FIGS. 2A and 2B are flowcharts illustrating in part a method for providing access to block storage, in accordance with an embodiment of the present invention.

Given that what is written is fault-tolerant, in most cases subsequent retrieval of the original datum by the daemon module 12 is not affected, even if some nodes in the storage array 2 are broken or incapacitated. Fault tolerance usually implies introducing a measure of redundancy in the original datum. Specifically, in one embodiment, the codec unit 103 performs forward error correction (FEC) on the original datum; in other words, the codec unit 103 encodes the original datum using an error-correcting code (ECC). There are a multitude of ECCs, of which the erasure code is taken as an example in the following description of FIG. 2A. As shown in the flowchart, after the receiver unit 101 intercepts (step S10) the system call indicating that the original datum written into the storage volume and generates in step S12 the proximal access command, the codec unit 103 generates m datum blocks in step S14 based on the original datum and the employed erasure code, m being a positive integer. A datum block may be a portion of the original datum, a redundancy for error correction, or a combination of both. The access unit 105 then selects some nodes of the storage array 2 and writes the datum blocks (and other required information) respectively into these nodes in step S16. Depending on the relative quantity of the nodes and the datum blocks, there may be nodes in the storage array 2 that are not stored with any of the m datum blocks, or it may be that every node stores an m-th of the fault-tolerant version, or that some nodes store more than one of the m datum blocks.

Figure 2B:
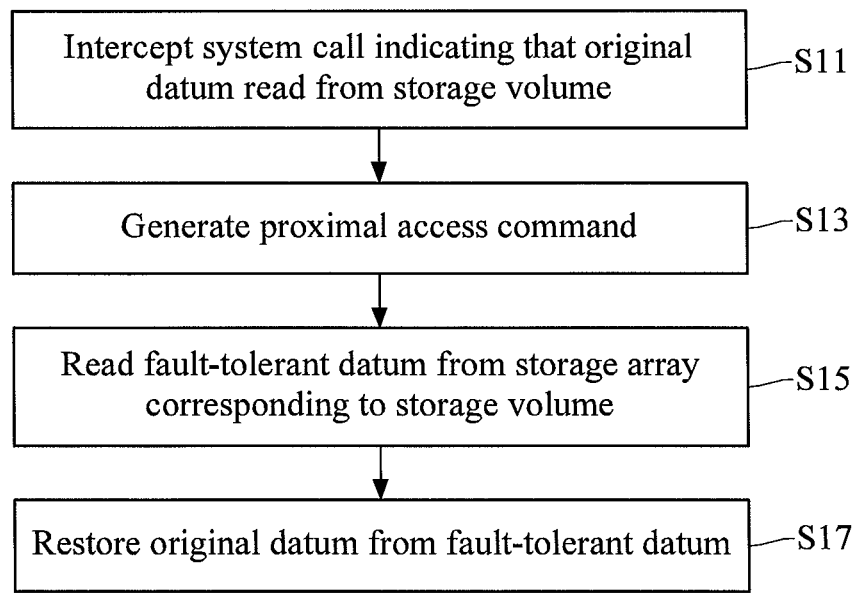

The erasure code works in such a way that the original datum can be restored from any k said datum blocks, k being a positive integer not greater than m; that is, assuming that every node in the storage array 2 stores an m-th of the fault-tolerant datum, the integrity and validity of the original datum is intact when there are no more than m-k broken or incapacitated nodes. Please refer to FIG. 2B as a complement of FIG. 2A. As shown in FIG. 2B, after the receiver unit 101 intercepts (step S11) the system call indicating that the original datum read from the storage volume and generates in step S13 the proximal access command, the access unit 105 reads in step S15 at least k datum blocks from the storage array 2, in particular from the nodes storing one of the m datum blocks. In step S17, the codec unit 103 restores the original datum based on the read datum blocks (and other required information).

Figure 3:
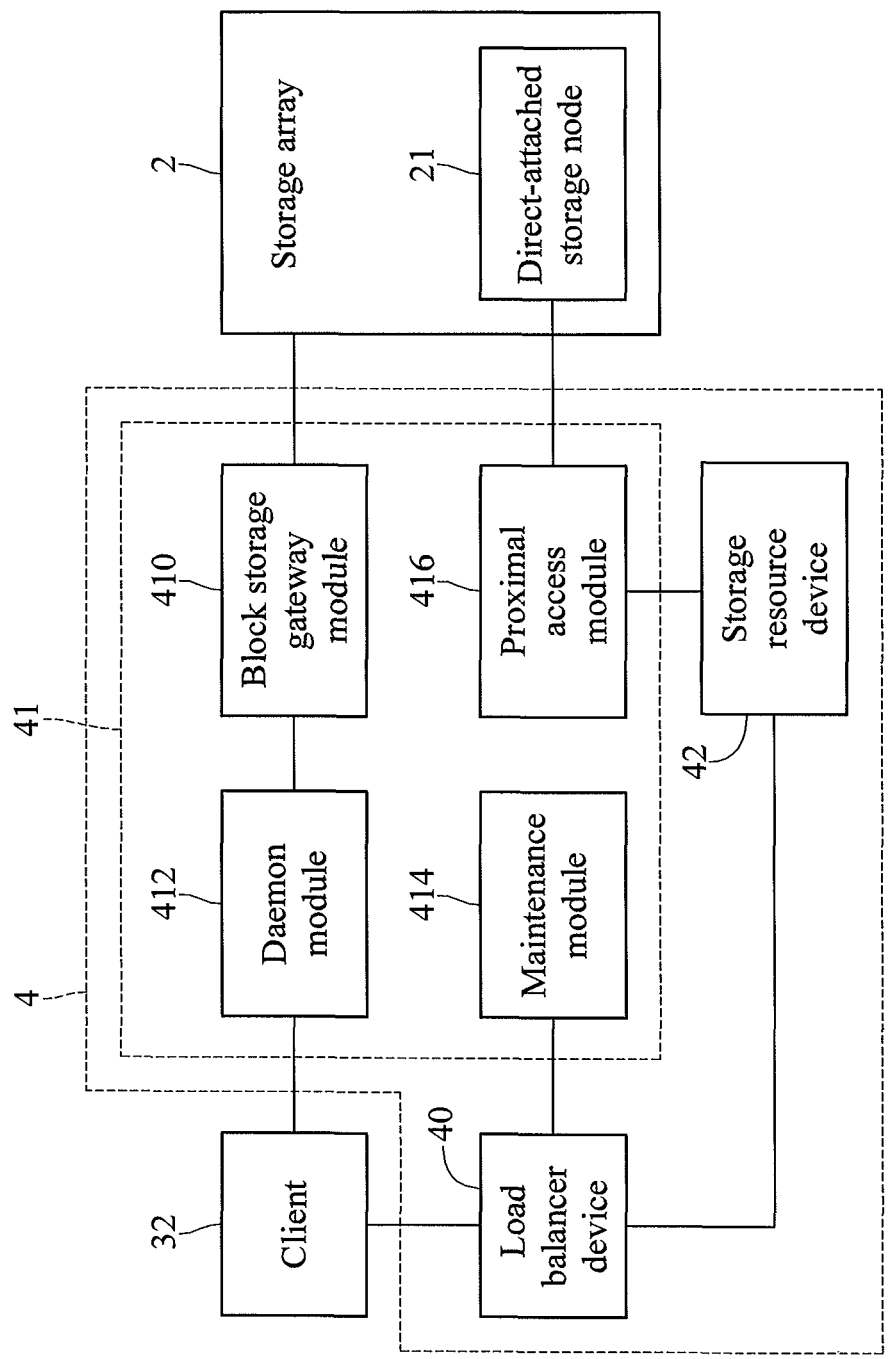
FIG. 3 is a block diagram illustrating a mediator system for storage, in accordance with an embodiment of the present invention.

Please refer to FIG. 3. As shown in the block diagram, a mediator system 4 for storage comprises storage resource devices 41 and 42 and a load balancer device 40. The storage resource device 41 comprises a block storage gateway module 410, a daemon module 412, a maintenance module 414, and a proximal access module 416. The storage resource device 41 may be the same as the storage resource device 1 in FIG. 1; therefore, the daemon module 412 is the daemon module 12, and the block storage gateway module 410 is coupled with the storage array 2 at the access unit 105, just as the block storage gateway module 10 is. The daemon module 412 communicates with a client 32 that may be coupled thereto through a network, especially when it receives from the client 32 a remote access command issued against the storage resource device 41. The communication between the daemon module 412 and the client 32 may conform with iSCSI (Internet Small Computer System Interface) or its Ethernet counterpart (HyperSCSI), Fibre Channel or its Ethernet or Internet Protocol counterpart (Fibre Channel over Ethernet or IP), ATA over Ethernet, or another network storage protocol. In iSCSI jargon, the storage resource devices 41 and 42 may represent the same target, and the daemon module 412 may be a daemon waiting for SCSI commands, tgtd being a common example.

Figure 4A:
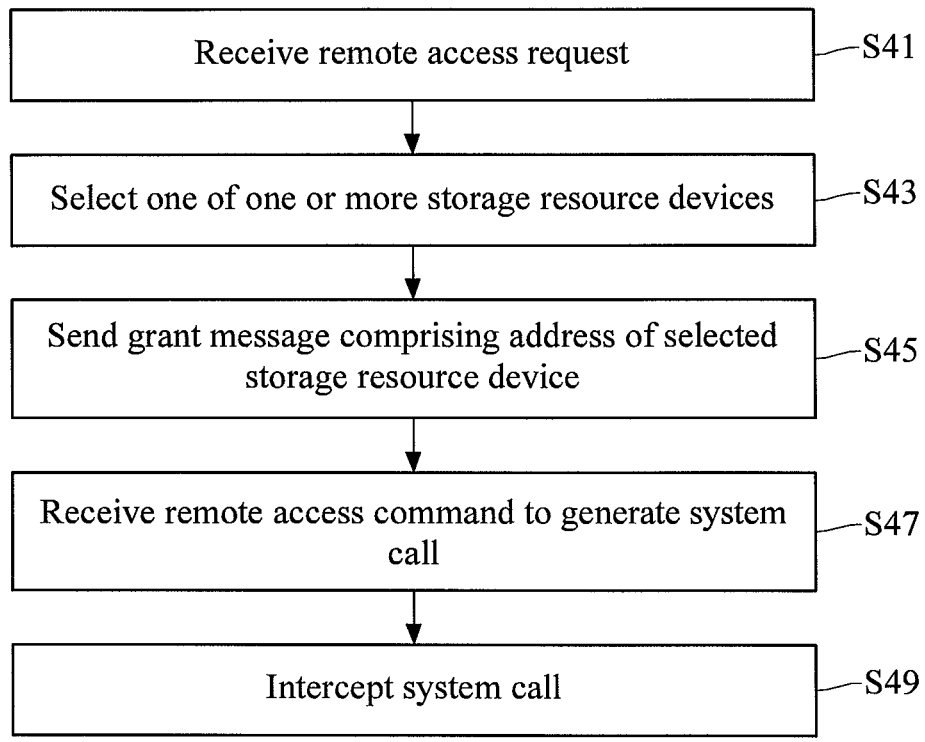
FIG. 4A is a flowchart of a mediating method for storage, in accordance with an embodiment of the present invention.

In terms of iSCSI, please refer to FIG. 4A, which illustrates the interaction between the client 32, the load balancer device 40, and the storage resource devices 41 and 42. As shown in the flowchart, the client 32 sends a remote access request in step S41, consulting the load balancer device 40 on how to access a particular target. The load balancer device 40 selects in step S43 one storage resource device from the storage resource devices 41 and 42 and others that may be present in the mediator system 4. Suppose that the storage resource device 41 is chosen. In step S45, the load balancer device 40 sends a grant message comprising an address of the storage resource device 41 in reply to the client 32. The address may be a network address comprising a domain name or port number, or a code name sufficient for identifying the storage resource device 41. In this regard, the load balancer device 40 also functions similarly to a domain name server (DNS).

Based on the address obtained in step S45, the client 32 sends a remote access command in step S47 to the storage resource device 41 as an initiator. The remote access command is converted by the daemon module 412 to a system call, which is intercepted in step S49 by the block storage gateway module 410. Thereafter follows the procedure illustrated in FIG. 2A or 2B.

Figure 4B:
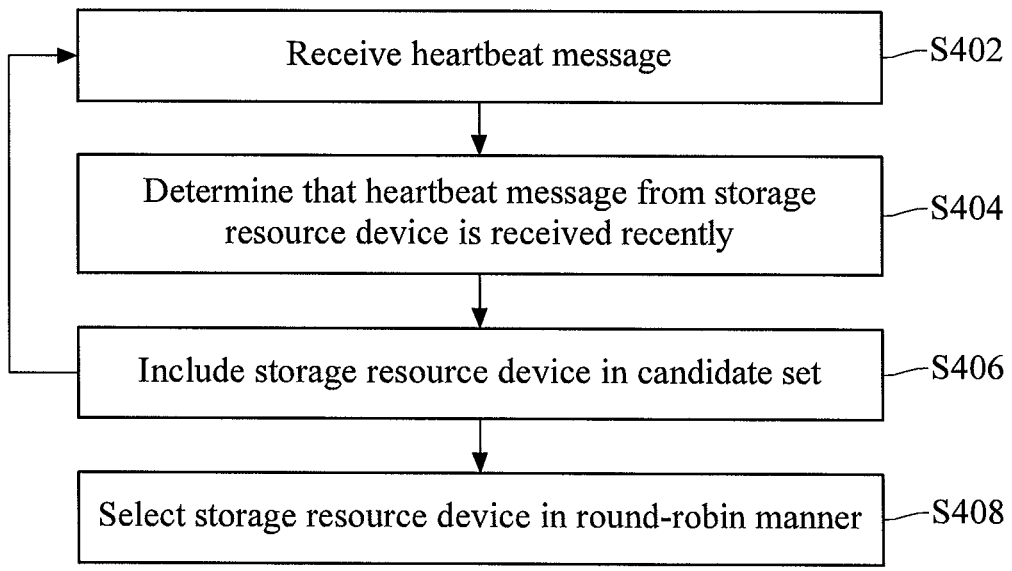
FIG. 4B is a flowchart of a load balancer device selecting one of one or more storage resource devices based on heartbeat messages, in accordance with an embodiment of the present invention.

In one embodiment, the storage resource devices 41 and 42, operating normally, periodically report to the load balancer device 40 using heartbeat messages, based on whose existence and contents the load balancer device 40 executes step S43. Please refer to FIG. 4B and take the storage resource device 41 as a concrete example. As shown in the flowchart, periodically, the maintenance module 414 sends a heartbeat message in step S402. Because the heartbeat message from the storage resource device 41 is received just now in step S402, the load balancer device 40 determines in step S404 that the storage resource device 41 is operating normally and includes it in a candidate set in step S406 while expecting the next heartbeat message sent by the maintenance module 414 in step S402. In one embodiment, the storage resource devices in the candidate set are selected in a round-robin manner (step S408) in response to remote access requests for the target they represent, e.g. alternating between the storage resource devices 41 and 42.

As described before, there may be DAS nodes 21 in the storage array 2, such as the intrinsic hard disk drives of a computer implementing the storage resource device 41. In one embodiment, the heartbeat message of the storage resource device 41 further comprises a load value of the storage resource device 41, e.g. how much percentage or how many units of capacity is left of the DAS nodes 21. In another embodiment, the load balancer device 40 actively or passively detects the load of the storage resource device 41 through another channel. Suppose that in the mediator system 4 the load of the storage resource device 41 is significantly greater than that of the storage resource device 42 or another that may be present, e.g. its load value exceeds the average of the load values of all the storage resource devices by a standard deviation. The load balancer device 40 thereby issues commands to redistribute the portion of data overloading the storage resource device 41, by transferring it to the storage resource device 42 for instance. The redistributing commands may be sent to the daemon module 412, the maintenance module 414, or the said channel, depending on the implementation.

As shown in FIG. 3, the storage resource device 41 is coupled with the DAS node 21 at the block storage gateway module 410 and the proximal access module 416. Obviously the proximal access module 416 may, but not necessarily, share program code with the access unit 105. In one embodiment, when the storage resource device 42 performs a proximal access to the storage array that it sees and when that storage array comprises the DAS node 21, the storage resource device 42 may complete the part of the proximal access relevant to the DAS node 21 through the proximal access module 416. Specifically, the driver of a network interface controller (NIC) of the storage resource device 41 may be modified or hooked to handle special instructions associated with the mediator system 4, e.g. from another storage resource device.

Figure 5:
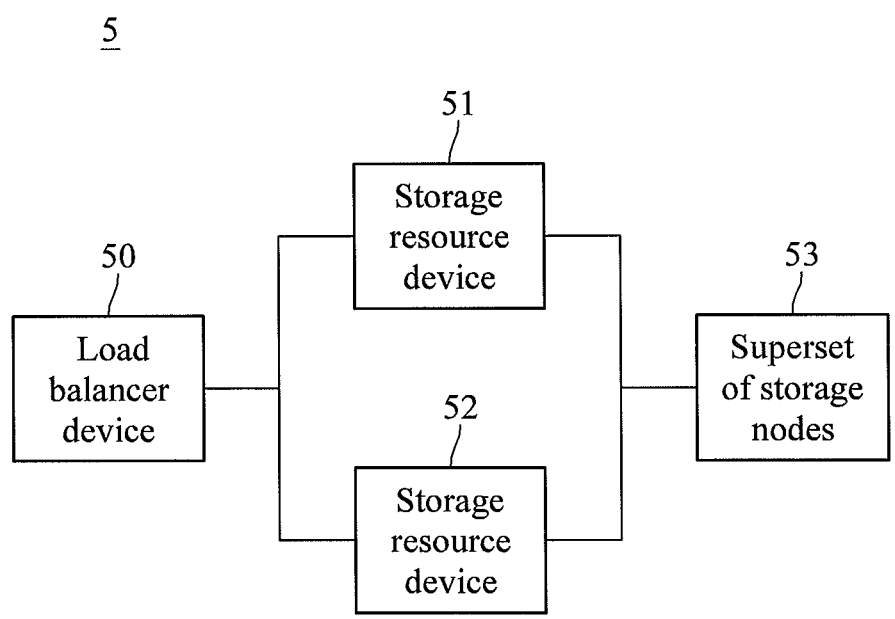
FIG. 5 is a block diagram of a cloud storage system, in accordance with an embodiment of the present invention.

Please refer to FIG. 5. As shown in the block diagram, a cloud storage system 5 comprises a load balancer device 50, storage resource devices 51 and 52, and a plurality of storage nodes forming a superset 53. The load balancer device 50 may be the same as the load balancer device 40 in FIG. 3, the storage resource device 51 or 52 may be the storage resource device 41, and the superset 53 also includes the storage array 2. An outside client accesses the cloud storage system 5 through a network, talking first to the load balancer device 50 and then to the storage resource device 51, 52, or another that may be present in the cloud storage system 5, in a procedure detailed by steps S41 to S47 in FIG. 4A.

The content delivery apparatus provided by this disclosure is configured to deploy a storage resource device, in particular equipping it with a block storage gateway module. Specifically, the content delivery apparatus may provide a computer that is implementing the storage resource device with the installer or patch of the block storage gateway module, or it may push a configuration of the operating system to the computer. Alternatively, the content delivery apparatus may simply be a file server hosting the program code implementing the method for providing access to block storage, and a management of a cloud storage system downloads the program code and distributes it to the managed storage resource devices. The management is coupled with one or more storage resource devices in much the same way as a load balancer device is.

To summarize, by mediating between block storage and the client side, load-balanced, highly available and scalable cloud storage can be constructed from commodity hardware. The present invention, with its purely software-defined storage, does not rely on any special hardware design and is thus flexible and agile in management.

What is claimed is:

1. A block storage gateway module comprising:
   a receiver unit configured to intercept a system call to an operating system in order to generate a proximal access command, the system call indicating a local access to a storage volume; and
   an access unit configured to perform, based on the proximal access command, a proximal access to a storage array, the storage array corresponding to the storage volume, the proximal access corresponding to the local access;
   wherein the operating system is performed in a cloud server, the system call is generated according to a remote access command, and the remote access command is related to a remote access request sent from a client to the cloud server, and the remote access request is related to read or write an original datum corresponding to the cloud server;
   wherein the block storage gateway module further comprising:
   a codec unit coupled with the access unit and configured to generate a fault-tolerant datum corresponding to the original datum;
   wherein the proximal access signifies writing the fault-tolerant datum into the storage array when the local access signifies writing the original datum into the storage volume.

2. The block storage gateway module of claim 1, wherein the receiver unit forms at least part of program code configured to handle the system call in the operating system.

3. The block storage gateway module of claim 2, wherein an entry associated with the system call in a system call table of the operating system is directed toward the receiver unit.

4. The block storage gateway module of claim 1, wherein the proximal access command is an input/output control and at least part of the access unit resides in the user space of the operating system.

5. The block storage gateway module of claim 1, wherein the proximal access command is an inter-process communication and the access unit comprises a driver.

6. The block storage gateway module of claim 1, wherein when the codec unit generates the fault-tolerant datum, the codec unit encodes the original datum using an error-correcting code.

7. The block storage gateway module of claim 6, wherein when the codec unit encodes the original datum using the error-correcting code, the codec unit generates, based on the original datum and the error-correcting code, m datum blocks which form at least part of the fault-tolerant datum, m being a positive integer.

8. The block storage gateway module of claim 7, wherein the storage array comprises a plurality of storage nodes, and when the access unit writes the fault-tolerant datum into the storage array, the access unit writes the m datum blocks respectively and selectively into the storage nodes.

9. The block storage gateway module of claim 7, wherein the codec unit is further configured to restore the original datum from the fault-tolerant datum, and the proximal access signifies reading the fault-tolerant datum from the storage array when the local access signifies reading the original datum from the storage volume.

10. The block storage gateway module of claim 9, wherein when the codec unit restores the original datum from the fault-tolerant datum, the codec unit generates the original datum based on any k datum blocks of the m datum blocks, k being a positive integer not greater than m.

11. The block storage gateway module of claim 1, further comprising:
    a codec unit coupled with the access unit and configured to restore the original datum from the fault-tolerant datum corresponding to the original datum;
    wherein the proximal access signifies reading the fault-tolerant datum from the storage array when the local access signifies reading the original datum from the storage volume.

12. A method for providing access to block storage, the method comprising:
    intercepting a system call to an operating system in order to generate a proximal access command, the system call indicating a local access to a storage volume; and
    performing, based on the proximal access command, a proximal access to a storage array, the storage array corresponding to the storage volume, the proximal access corresponding to the local access;
    wherein the operating system is performed in a cloud server, the system call is generated according to a remote access command, and the remote access command is related to a remote access request sent from a client to the cloud server, and the remote access request is related to read or write an original datum corresponding to the cloud server;
    wherein when the local access signifies writing the original datum into the storage volume, performing the proximal access to the storage array comprises:

generating a fault-tolerant datum corresponding to the original datum; and writing the fault-tolerant datum into the storage array.

13. The method of claim 12, wherein generating the fault-tolerant datum comprises encoding the original datum using an error-correcting code.

14. The method of claim 13, wherein encoding the original datum using the error-correcting code comprises generating, based on the original datum and the error-correcting code, m datum blocks which form at least part of the fault-tolerant datum, m being a positive integer.

15. The method of claim 14, wherein the storage array comprises a plurality of storage nodes, and writing the fault-tolerant datum into the storage array comprises writing the m datum blocks respectively and selectively into the storage nodes.

16. The method of claim 14, wherein when the local access signifies reading the original datum from the storage volume, performing the proximal access to the storage array comprises:

reading the fault-tolerant datum from the storage array; and restoring the original datum from the fault-tolerant datum.

17. The method of claim 16, wherein restoring the original datum from the fault-tolerant datum comprises generating the original datum based on any k datum blocks of the m datum blocks, k being a positive integer not greater than m.

18. The method of claim 12, wherein when the local access signifies reading the original datum from the storage volume, performing the proximal access to the storage array comprises:

reading from the storage array the fault-tolerant datum corresponding to the original datum; and restoring the original datum from the fault-tolerant datum.

19. The method of claim 12, wherein the proximal access command is an input/output control or an inter-process communication.

20. A mediator system for storage, the mediator system comprising:

one or more storage resource devices, each of which comprising:

a daemon module configured to receive a remote access command in order to generate a system call, the remote access command indicating a remote access to the storage resource device; and a block storage gateway module configured to intercept the system call and perform, based on the system call, a proximal access to a storage array, the storage array corresponding to the storage resource device, the proximal access corresponding to the remote access; and a load balancer device configured to receive a remote access request, to select one of the one or more storage resource devices, and to send a grant message comprising an address of the selected storage resource device;

wherein the system call is to an operating system performed in a cloud server, the remote access command is related to the remote access request sent from a client to the cloud server, and the remote access request is related to read or write an original datum corresponding to the cloud server;

wherein when the remote access signifies writing the original datum into the storage resource device, the block storage gateway module is further configured to generate a fault-tolerant datum corresponding to the original datum and the proximal access signifies writing the fault-tolerant datum into the storage array.

21. The mediator system of claim 20, wherein when the remote access signifies reading the original datum from the storage resource device, the proximal access signifies reading from the storage array the fault-tolerant datum corresponding to the original datum and the block storage gateway module is further configured to restore the original datum from the fault-tolerant datum.

22. The mediator system of claim 20, wherein each of the one or more storage resource devices further comprises a maintenance module configured to periodically send a heartbeat message, and the load balancer device selecting one of the one or more storage resource devices is based on the heartbeat message from each of the one or more storage resource devices.

23. The mediator system of claim 22, wherein when the load balancer device selects one of the one or more storage resource devices, for each of the one or more storage resource devices the load balancer device determines whether the heartbeat message from the storage resource device is received recently, wherein the load balancer device includes the storage resource device in a candidate set when the heartbeat message from the storage resource device is received recently.

24. The mediator system of claim 23, wherein the selected storage resource device is selected from the candidate set in a round-robin manner.

25. The mediator system of claim 20, wherein the storage array corresponding to each of the one or more storage resource devices comprises one or more storage nodes, at least one of which is directly attached to the storage resource device.

26. The mediator system of claim 25, wherein each of the one or more storage resource devices further comprises a proximal access module configured to perform, to the storage node directly attached to the storage resource device, at least part of the proximal access from another of the one or more storage resource devices.

27. The mediator system of claim 25, wherein the load balancer device is further configured to monitor a load value of each of the one or more storage resource devices, the load value associated with the storage node directly attached to the storage resource device, and when the mediator system comprises a plurality of storage resource devices and when the load value of a first storage resource device of the storage resource devices is significantly greater than the load value of a second storage resource device of the storage resource devices, the load balancer device is further configured to redistribute among the storage resource devices the load of the first storage resource device.

28. A mediating method for storage, the mediating method comprising:

receiving a remote access request;

selecting one of one or more storage resource devices;

sending a grant message comprising an address of the selected storage resource device;

receiving a remote access command in order to generate a system call, the remote access command indicating a remote access to the selected storage resource device;

intercepting the system call; and performing, based on the system call, a proximal access to a storage array, the storage array corresponding to the selected storage resource device, the proximal access corresponding to the remote access;

wherein the system call is to an operating system performed in a cloud server, the remote access command is related to the remote access request sent from a client to the cloud server, and the remote access request is related to read or write an original datum corresponding to the cloud server;

wherein when the remote access signifies writing the original datum into the selected storage resource device, performing the proximal access to the storage array comprises:

generating a fault-tolerant datum corresponding to the original datum; and writing the fault-tolerant datum into the storage array.

29. The mediating method of claim 28, wherein when the remote access signifies reading the original datum from the selected storage resource device, performing the proximal access to the storage array comprises:

reading from the storage array the fault-tolerant datum corresponding to the original datum; and restoring the original datum from the fault-tolerant datum.

30. The mediating method of claim 28, further comprising:

sending periodically a heartbeat message;

wherein selecting one of the one or more storage resource devices is based on the heartbeat message from each of the one or more storage resource devices.

31. The mediating method of claim 30, wherein selecting one of the one or more storage resource devices comprises:

for each of the one or more storage resource devices, determining whether the heartbeat message from the storage resource device is received recently;

wherein the storage resource device is included in a candidate set when the heartbeat message from the storage resource device is received recently.

32. The mediating method of claim 31, wherein the selected storage resource device is selected from the candidate set in a round-robin manner.

33. A cloud storage system comprising:

a plurality of storage nodes;

one or more storage resource devices, each of which configured to receive a remote access command, to intercept a system call corresponding to the remote access command, and to perform, based on the system call, a proximal access to a storage array, the remote access command indicating a remote access to the storage resource device, the storage array corresponding to the storage resource device and comprising one or more of the storage nodes; and a load balancer device configured to receive a remote access request, to select one of the one or more storage resource devices, and to send a grant message comprising an address of the selected storage resource device;

wherein the system call is to an operating system performed in a cloud server, the remote access command is related to the remote access request sent from a client to the cloud server, and the remote access request is related to read or write an original datum corresponding to the cloud server;

wherein when the remote access signifies writing the original datum into the selected storage resource device, the selected storage resource device is further configured to generate a fault-tolerant datum corresponding to the original datum, and write the fault-tolerant datum into the storage array.

34. The cloud storage system of claim 33, wherein among the one or more storage nodes of the storage array corresponding to each of the one or more storage resource devices, at least one storage node is directly attached to the storage resource device.

35. The cloud storage system of claim 34, wherein the load balancer device is further configured to monitor a load value of each of the one or more storage resource devices, the load value associated with the storage node directly attached to the storage resource device, and the load balancer device is further configured to redistribute the load of one of the one or more storage resource devices.

36. A content delivery apparatus configured to deploy a computer, causing the computer to be provided with program code which causes the computer to execute a plurality of instructions, the instructions comprising:

intercepting a system call to an operating system in order to generate a proximal access command, the system call indicating a local access to a storage volume; and performing, based on the proximal access command, a proximal access to a storage array, the storage array corresponding to the storage volume, the proximal access corresponding to the local access;

wherein the operating system is performed in a cloud server, the system call is generated according to a remote access command, and the remote access command is related to a remote access request sent from a client to the cloud server, and the remote access request is related to read or write an original datum corresponding to the cloud server;

wherein when the local access signifies writing the original datum into the storage volume, performing the proximal access to the storage array comprises:

generating a fault-tolerant datum corresponding to the original datum; and writing the fault-tolerant datum into the storage array.

37. The content delivery apparatus of claim 36, wherein generating the fault-tolerant datum comprises encoding the original datum using an error-correcting code.

38. The content delivery apparatus of claim 37, wherein encoding the original datum using the error-correcting code comprises generating, based on the original datum and the error-correcting code, m datum blocks which form at least part of the fault-tolerant datum, m being a positive integer.

39. The content delivery apparatus of claim 38, wherein the storage array comprises a plurality of storage nodes, and writing the fault-tolerant datum into the storage array comprises writing the m datum blocks respectively and selectively into the storage nodes.

40. The content delivery apparatus of claim 38, wherein when the local access signifies reading the original datum from the storage volume, performing the proximal access to the storage array comprises:

reading the fault-tolerant datum from the storage array; and restoring the original datum from the fault-tolerant datum.

41. The content delivery apparatus of claim 40, wherein restoring the original datum from the fault-tolerant datum comprises generating the original datum based on any k datum blocks of the m datum blocks, k being a positive integer not greater than m.

42. The content delivery apparatus of claim 36, wherein when the local access signifies reading the original datum from the storage volume, performing the proximal access to the storage array comprises:

reading from the storage array the fault-tolerant datum corresponding to the original datum; and restoring the original datum from the fault-tolerant datum.

43. The content delivery apparatus of claim 36, wherein the proximal access command is an input/output control or an inter-process communication.

* * * * *